US011604904B2

(12) United States Patent
Shi et al.

(10) Patent No.: US 11,604,904 B2
(45) Date of Patent: *Mar. 14, 2023

(54) METHOD AND SYSTEM FOR SPACE DESIGN

(71) Applicant: NORTHWEST INSTRUMENT INC., Dover, NJ (US)

(72) Inventors: Xin Shi, Shanghai (CN); David Xing, Dover, NJ (US)

(73) Assignee: NORTHWEST INSTRUMENT INC., Dover, NJ (US)

(*) Notice: Subject to any disclaimer, the term of this patent is extended or adjusted under 35 U.S.C. 154(b) by 249 days.

This patent is subject to a terminal disclaimer.

(21) Appl. No.: 17/037,183

(22) Filed: Sep. 29, 2020

(65) Prior Publication Data

US 2021/0012042 A1  Jan. 14, 2021

Related U.S. Application Data

(63) Continuation-in-part of application No. 16/109,826, filed on Aug. 23, 2018, now Pat. No. 10,796,032.

(30) Foreign Application Priority Data

Mar. 19, 2018  (CN) .......................... 201810223563.5

(51) Int. Cl.
*G06F 30/13* (2020.01)
*G06T 19/20* (2011.01)
(Continued)

(52) U.S. Cl.
CPC .............. *G06F 30/13* (2020.01); *G01C 3/02* (2013.01); *G01C 15/00* (2013.01); *G06T 7/11* (2017.01);
(Continued)

(58) Field of Classification Search
CPC ......... G06F 30/13; G06F 30/00; G01C 15/00; G06T 19/00
See application file for complete search history.

(56) References Cited

U.S. PATENT DOCUMENTS

| 5,161,313 A | 11/1992 | Rijlaarsadam |
| 7,032,458 B2 | 4/2006 | Tanaka |

(Continued)

FOREIGN PATENT DOCUMENTS

| CN | 101451831 A | 6/2009 |
| CN | 103729409 A | 4/2014 |

(Continued)

OTHER PUBLICATIONS

Bhattacharya (Bhattacharya, B., & Winer, E. (Mar. 2015). A method for real-time generation of augmented reality work instructions via expert movements. In the Engineering Reality of Virtual Reality 2015 (vol. 9392, p. 93920G). International Society for Optics and Photonics.) (Year: 2015).

(Continued)

*Primary Examiner* — Bijan Mapar
(74) *Attorney, Agent, or Firm* — Anova Law Group, PLLC

(57) ABSTRACT

A method for space design includes: receiving first information of a physical space by a terminal device, the first information including size measurement information of the physical space; acquiring second information of a target object, the second information including size measurement information of the target object; performing a visual presentation of the first information of the physical space and the second information of the target object on a display interface of the terminal device; calculating construction information of the target object being placed in the physical space by the terminal device based on a layout of the target object on the visual presentation according to the first
(Continued)

information of the physical space and the second information of the target object; outputting the calculated construction information through a communication interface of the terminal device to a ranging and positioning apparatus; and guiding a user to position the target object in the physical space using a positioning function of the ranging and positioning apparatus according to the construction information, the size measurement information of the physical space, and the size measurement information of the target object.

20 Claims, 4 Drawing Sheets

(51) Int. Cl.
| | |
|---|---|
| *G06T 19/00* | (2011.01) |
| *G01C 3/02* | (2006.01) |
| *G06F 111/18* | (2020.01) |
| *G01C 15/00* | (2006.01) |
| *G06T 7/11* | (2017.01) |
| *G06T 7/62* | (2017.01) |
| *G06Q 10/08* | (2012.01) |
| *G06Q 10/087* | (2023.01) |

(52) U.S. Cl.
CPC .............. *G06T 7/62* (2017.01); *G06T 19/006* (2013.01); *G06T 19/20* (2013.01); *G06F 2111/18* (2020.01); *G06Q 10/087* (2013.01); *G06T 2210/04* (2013.01); *G06T 2219/2004* (2013.01)

(56) References Cited

U.S. PATENT DOCUMENTS

| | | |
|---|---|---|
| 2002/0093538 A1 | 7/2002 | Carlin |
| 2005/0081161 A1 | 4/2005 | MacInnes et al. |
| 2007/0179645 A1 | 8/2007 | Nixon |
| 2008/0071559 A1 | 3/2008 | Arrasvuori |
| 2012/0116914 A1 | 5/2012 | Stinson et al. |
| 2014/0267717 A1 | 9/2014 | Pitzer et al. |
| 2015/0248584 A1 | 9/2015 | Greveson et al. |

FOREIGN PATENT DOCUMENTS

| | | |
|---|---|---|
| CN | 104118491 A | 10/2014 |
| CN | 203958374 U | 11/2014 |
| CN | 104634222 A | 5/2015 |
| CN | 204514232 U | 7/2015 |
| EP | 0867690 A1 | 9/1998 |
| EP | 2698600 A1 | 2/2014 |
| EP | 2824525 A1 | 1/2015 |
| GB | 2513238 A | 10/2014 |
| JP | 5847348 B1 | 1/2016 |

OTHER PUBLICATIONS

Hou (Hou, L., Wang, X., Bernold, L., & Love, P. E. (2013). Using animated augmented reality to cognitively guide assembly. Journal of Computing in Civil Engineering, 27(5), 439-451.) (Year: 2013).
Syberfeldt (Syberfeldt, A., Danielsson, O., Holm, M., & Wang, L. (2015). Visual assembling guidance using augmented reality. Procedia Manufacturing, 1, 98-109.) (Year: 2015).
The European Patent Office (EPO) the Extended European Search Report for 16882941.4 dated Oct. 14, 2019 7 Pages.
The European Patent Office (EPO) the Extended European Search Report for 16888645.5 dated Sep. 2, 2019 10 Pages.
The European Patent Office (EPO) the Extended European Search Report for 18206500.3 dated May 14, 2019 11 Pages.
Zauner, J., Haller, M., Brandl, A., & Hartmann, W. (Oct. 2003). Authoring of a mixed reality assembly instructor for hierarchical structures. In Proceedings of the 2nd IEEE/ACM International Symposium on Mixed and Augmented Reality (p. 237). IEEE Computer Society. (Year: 2003).
Kasahara, S., Niiyama, R., Heun, V., & Ishii, H. (Feb. 2013). exTouch: spatially-aware embodied manipulation of actuated objects mediated by augmented reality. In Proceedings of the 7th International Conference on Tangible, Embedded and Embodied Interaction (pp. 223-228). ACM. (Year: 2013).
Phan, V. T., & Choo, S. Y. (2010). Interior design in augmented reality environment. International Journal of Computer Applications, 5(5), 16-21. (Year: 2010).

METHOD AND SYSTEM FOR SPACE DESIGN

CROSS-REFERENCE TO RELATED APPLICATION

This application is a continuation-in-part application of U.S. patent application Ser. No. 16/109,826, filed on Aug. 23, 2018, which claims priority of Chinese Patent Application No. 201810223563.5, filed on Mar. 19, 2018, the entire contents of both of which are incorporated herein by reference.

TECHNICAL FIELD

The present invention relates generally to the field of space design, and more particularly to a method for space design and a system for space design.

BACKGROUND

In the current architecture and decoration fields, measurements are performed in the real scene firstly, and then materials and household items are selected and bought in the large shopping malls or markets according to the size data in the real scene. The selected items cannot be instantly seen on the computer or the mobile phone. Meanwhile, measurement, design, purchase and construction are separate and independent steps, thereby making the entire architecture design and construction process inefficient.

In addition, in this process, the tools used are numerous, multiple measurements and multiple records are required, and the data generated or used cannot be synchronized or shared with the data information of the CAD design system, thus making the period of design and construction very long, the cost high, and the equipment required more and the inefficiency low.

Furthermore, as constructing according to the drawings, the positioning target point needs to be determined by using the conventional measuring tool for multiple measurements, which also makes construction performed using the conventional methods according to the drawings time-consuming, labor-consuming, and inconvenient, thereby increasing the cost of the whole process.

In summary, in the prior art, either measurement, design, material selection or construction, there are many deficiencies or inconveniences such as at least the existing deficiencies:

First, in current surveying and mapping, designing and performing are completely separate, i.e., virtuality and reality are independent. Manpower is required to transfer critical data.

Second, the current surveying and mapping cannot get the results in time, cannot reflect as a whole and depends on the computer which leads to poor flexibility.

Third, in the current surveying and mapping, the positioning way is cumbersome and time-consuming.

Fourth, design sharing is inactive due to file format limitations.

SUMMARY

In view of the above technical problem, the prior art designing and performing are completely separated, so that the design efficiency is low, and the current surveying and mapping cannot acquire the drawing result in time, and thus cannot directly reflect the whole, resulting in the existing design method being too dependent on the computer, which leads to poor flexibility.

The inventor of the present disclosure considers to integrating design, material selection, purchase, payment, express delivery, and construction into a large system platform, and combining smart tools with the support of respective applications, servers, and e-commerce platforms, so as to achieve data sharing, real-time feedback, rapid measurement, rapid design, rapid material selection, rapid construction, and to form the seamless connection of each stage, to real-time monitor, and then to effectively control the human, resource and time costs of each stage so as to improve the efficiency of performing eventually.

A first aspect of the present disclosure provides a method for space design, the method comprising: acquiring first information of a scene to be spatially designed; acquiring second information of a target object that can be placed into the scene from a third party through a communication interface; performing a visual presentation of the first information and the second information; and calculating construction information based on a layout of the target object on the visual presentation performed by the user who performs the space design.

In this way, on one hand, it is possible to simultaneously acquire information about a scene and a target object to be placed in the scene from a device such as a portable device, after performing the visual presentation of the information, the user who performs the space design can observe the design effects in real-time base on the layout of the target object on the visual presentation, thereby determining whether to purchase, the construction can further be instructed according to the calculated construction information after designing, thus the design on the virtual visual presentation may be put into practice to recover to the actual scene.

In one embodiment in accordance with the present disclosure, the method further comprises: outputting the calculated construction information through the communication interface.

In one embodiment in accordance with the present disclosure, outputting the calculated construction information through the communication interface comprises outputting the calculated construction information, through the communication interface, to a ranging and positioning apparatus that performs ranging and positioning, such that the ranging and positioning apparatus performs positioning of the target object according to the construction information. Those skilled in the art should understand that the ranging and positioning apparatus here refers to a type of apparatus, for example, a surveying tool such as a ranging instrument, a ranging wheel and the like, or a smart terminal such as a mobile phone or a Pad, and AR glasses, etc.

The embodiment according to the present disclosure can allow the ranging and positioning apparatus to acquire the calculated construction information in a communication manner such that the ranging and positioning apparatus performs positioning of the target object according to the construction information.

In one embodiment in accordance with the present disclosure, the construction information comprises construction marking points displayed on the visual representation to implement the layout of the target object by augmented reality technology.

In such an implementation, another method can be provided to implement the layout, i.e., the layout of the target object is implemented by augmented reality techniques by means of displaying construction marking points on the visual representation.

In one embodiment in accordance with the present disclosure, the first information and/or the second information comprises size information, in the process of placing the target object into the scene and performing the design by the user, the size of the target object and the size information of the scene are matched, and the position information of the target object in the scene is generated in real time.

In this way, it is possible to observe on the visual presentation whether the target object is suitable for placing in the scene based on the size information and position information, and further, if the target object is suitable for being placed in the scene, the visual effect can be determined based on the size information, and then the layout of the target object will be optimized.

In one embodiment in accordance with the present disclosure, the first information and/or the second information further comprise color information and/or material information. In addition, optionally, the first information and/or the second information may further comprise information such as texture information, personal preference or behavioral habit record.

In such an embodiment, in addition to the size information, it is also possible to the user who performs the space design can observe the design effects in real-time base on the layout of the target object on the visual presentation after performing the visual presentation of the information, except for the size matching effect, these design effects can also comprise color matching effect and material matching effect, etc., and the presentation of design effects may be further optimized.

In one embodiment in accordance with the present disclosure, the second information further comprises brand, price, inventory, hyperlink information associated with the target object.

In such an embodiment, after the user who performs the space design observes the design effects in real-time based on the layout of the target object on the visual presentation, the user can place an order directly on a third party shopping platform such as Jingdong, Taobao, Amazon and the like according to brand, price, inventory, hyperlink information associated with the target object included in the second information, thereby improving design and corresponding construction efficiency and reducing costs.

In one embodiment of the present disclosure, acquiring the first information of the scene to be spatially designed further comprises: measuring and acquiring, by the ranging and positioning apparatus, the first information of the scene to be spatially designed; or receiving the first information of the scene to be spatially designed in a communication manner.

In such an implementation, on one hand, the method for space design can receive the first information of the scene to be spatially designed, such as an apartment layout and the like, in a communication manner; on the other hand, the method can measure and acquire the first information of the scene to be spatially designed by the ranging and positioning apparatus, such as by means of photographing and tool measuring, or by means of photographing and inputting the size information, or by photographing and a reference object with the size information. Here, the first information can be for example the pre-designed drawing.

Further, a second aspect of the present disclosure also provides a system for space design, the system comprising: a first information acquisition module configured to acquire first information of a scene to be spatially designed; a second information acquisition module configured to acquire second information of a target object that can be placed into the scene from a third party through a communication interface; a visual presentation module configured to perform a visual presentation of the first information and the second information; a computing module configured to calculate construction information based on a layout of the target object on the visual presentation performed by a user who performs the space design.

In one embodiment in accordance with the present disclosure, the system further comprises: an information output module configured to output the calculated construction information through the communication interface.

In one embodiment in accordance with the present disclosure, the information output module is further configured to output the calculated construction information, through the communication interface, to a ranging and positioning apparatus that performs ranging and positioning, such that the ranging and positioning apparatus performs positioning of the target object according to the construction information.

In one embodiment in accordance with the present disclosure, the construction information comprises construction marking points displayed on the visual presentation to implement the layout of the target object by augmented reality technology.

In one embodiment in accordance with the present disclosure, the first information and/or the second information comprise size information.

In one embodiment in accordance with the present disclosure, the first information and/or the second information further comprise color information and/or material information.

In one embodiment in accordance with the present disclosure, the second information further comprises brand, price, inventory, hyperlink information associated with the target object.

In one embodiment in accordance with the present disclosure, the first information acquisition module is further configured to: measure and acquire, by the ranging and positioning apparatus, the first information of the scene to be spatially designed; or receive the first information of the scene to be spatially designed in a communication manner.

According to one aspect of the present disclosure, a method for space design is provided. The method include: receiving first information of a physical space by a terminal device, the first information including size measurement information of the physical space; acquiring second information of a target object, the second information including size measurement information of the target object; performing a visual presentation of the first information of the physical space and the second information of the target object on a display interface of the terminal device; calculating construction information of the target object being placed in the physical space by the terminal device based on a layout of the target object on the visual presentation according to the first information of the physical space and the second information of the target object; outputting the calculated construction information through a communication interface of the terminal device to a ranging and positioning apparatus; and guiding a user to position the target object in the physical space using a positioning function of the ranging and positioning apparatus according to the construction information, the size measurement information of the physical space, and the size measurement information of the target object.

According to another aspect of the present disclosure, a terminal device is provided. The terminal device includes a memory, storing computer-executable instructions; and a processor, coupled with the memory and, when the computer-executable instructions being executed, configured to perform: receiving first information of a physical space, the first information including size measurement information of the physical space; acquiring second information of a target object, the second information including size measurement information of the target object; performing a visual presentation of the first information of the physical space and the second information of the target object on a display interface of the terminal device; calculating construction information of the target object being placed in the physical space based on a layout of the target object on the visual presentation according to the first information of the physical space and the second information of the target object; outputting the calculated construction information through a communication interface to a ranging and positioning apparatus; and guiding a user to position the target object in the physical space using a positioning function of the ranging and positioning apparatus according to the construction information, the size measurement information of the physical space, and the size measurement information of the target object.

According to another aspect of the present disclosure, a non-transitory computer-readable storage medium is provided. The non-transitory computer-readable storage medium stores a plurality of instructions, wherein the plurality of instructions, when executed by a processor, cause the processor to perform: receiving first information of a physical space, the first information including size measurement information of the physical space; acquiring second information of a target object, the second information including size measurement information of the target object; performing a visual presentation of the first information of the physical space and the second information of the target object on a display interface of the terminal device; calculating construction information of the target object being placed in the physical space based on a layout of the target object on the visual presentation according to the first information of the physical space and the second information of the target object; outputting the calculated construction information through a communication interface to a ranging and positioning apparatus; and guiding a user to position the target object in the physical space using a positioning function of the ranging and positioning apparatus according to the construction information, the size measurement information of the physical space, and the size measurement information of the target object.

In summary, the method for space design and the system for space design according to the present disclosure can acquire information about a scene and a target object to be placed in the scene from a device such as a portable device simultaneously, after performing the visual presentation of the information, the user who performs the space design can observe the design effects in real-time base on the layout of the target object on the visual presentation, thereby determining whether to purchase, the construction can further be instructed according to the calculated construction information after designing, thus the design on the virtual visual presentation may be put into practice to recover to the actual scene.

BRIEF DESCRIPTION OF THE DRAWINGS

Embodiments are illustrated and described with reference to the figures. These figures are used to clarify the basic principles and thus only illustrate the aspects necessary to understand the basic principles. The drawings are not to scale. In the figures, the same reference numerals indicate similar features.

Other features, aspects, advantages and benefits of the present invention will become more apparent by the following detailed description in conjunction with the accompanying figures.

DETAILED DESCRIPTION

In the following detailed description of the preferred embodiments, the reference is made to the accompanying figures that are composed as a part of the invention. The accompanying figures illustrate, by way of example, specific embodiments of the invention. The example embodiments are not intended to be exhaustive of all embodiments in accordance with the invention. It will be appreciated that other embodiments may be utilized and structural or logical modifications may be made without departing from the scope of the invention. Therefore, the following detailed description is not to be limited, and the scope of the invention should be limited only by the attached claims.

The technical solution claimed in the present disclosure is based on the following inventive concepts, namely:

The inventor of the present disclosure contemplates that big data storage is implemented by disposing user servers and e-commerce servers to the cloud, data in databases of user servers and e-commerce servers is processed by utilizing cloud computing, and data intercommunication is implemented by connecting mobile applications to web pages via the Internet, thereby integrating a big network data computing communication platform. The user browses e-commerce websites using the mobile phone or the computer terminal, and designs data module which is sent from the server on the cloud to the user smart terminal device in the Internet manner. The Internet manner here can comprise, for example, email, webpage WEB manners or other manners compliant with specific network protocols. The application on the smart terminal may import the data template into the application for re-design and adjustment.

Figure 1:
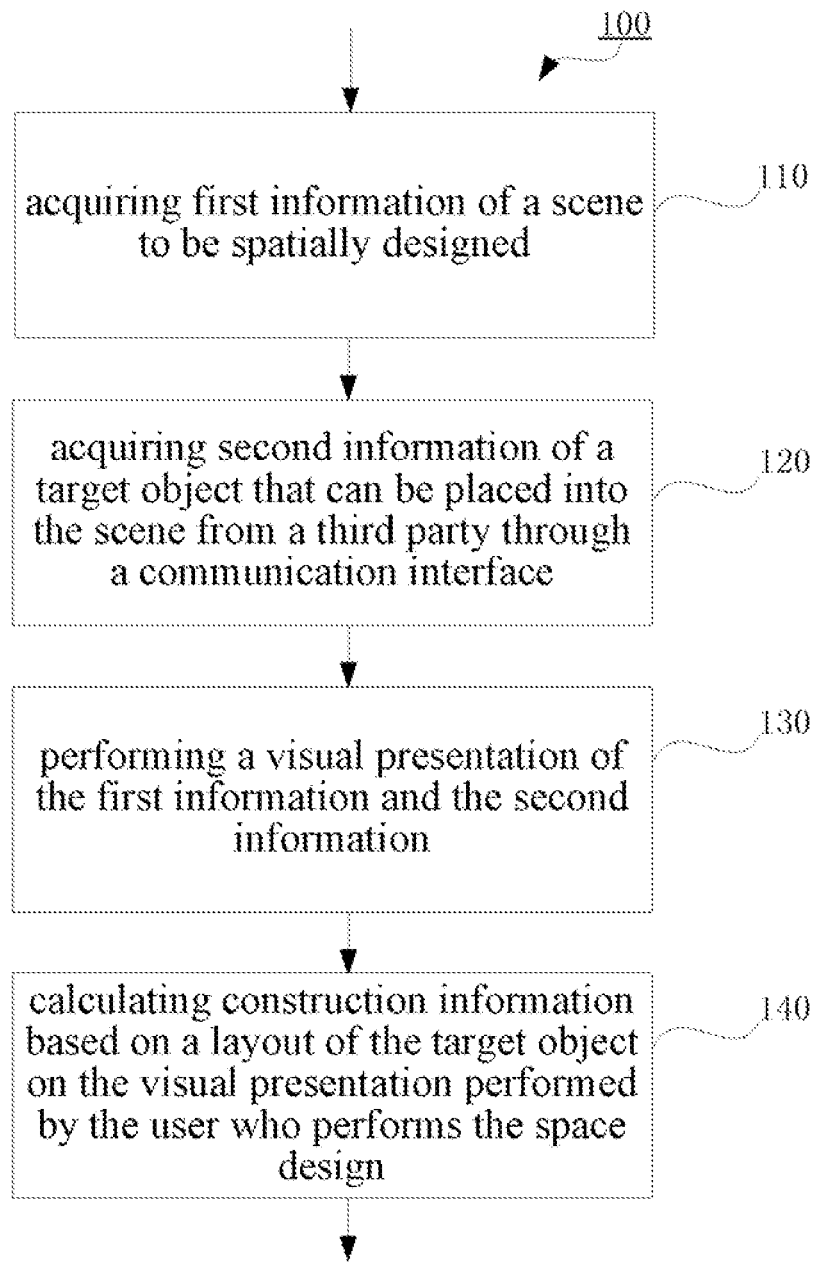
FIG. 1 illustrates a flow chart of a method for space design according to certain embodiments of the present disclosure.

FIG. 1 illustrates a flow chart of a method 100 for space design in accordance with the present disclosure, as can be seen from the figure, the method 100 for space design comprises the following steps:

First, in the method step 110, first information of a scene to be spatially designed is acquired, wherein the first information can comprise size information, for example, a scene to be placed, such as a room size or a wall size, etc., optionally the first information can also comprise color information and/or material information, texture information, the information indicating that the background color of the wall is yellow, beige, etc., and can also comprise, for example, background pattern information, for example, the information indicating the wall is a latex paint wall or a pink wallpaper wall, and the information about decoration such as a wall painting on the wall.

Then, in method step 120, second information of a target object that can be placed into the scene is acquired from a third party through a communication interface; wherein the second information can comprise size information, such as size information of a sofa, a dining table, a photo frame to be placed into the scene, optionally, the second information can also comprise color information, material information, and texture information, for example, the information indicating that the color of the sofa is white or beige, the surface of the end table is marble texture, etc., for example, can also comprise the information indicating that the color of the border of the photo frame is gold, the border of the photo frame is aluminum alloy, and the picture, pattern in the photo frame.

More preferably, the second information can also comprise brand, price, inventory, hyperlink information associated with the target object (e.g., a sofa, a photo frame). Generally speaking, after completing the design by the application on the terminal device, the commodities on the e-commerce platform used in the design can be summarized and directly purchased. The user's information (name, contact information, payment method) and product information (price, model, quantity, etc.) may be integrated to generate order information by connecting to the e-commerce platform server on the cloud through the Internet. Users can complete order transactions directly on the terminal device or on the e-commerce platform website.

Next, in method step 130, the first information and the second information will be visually presented. Here, as the computer technology employed for visual presentation or rendering is a conventional means used by those skilled in the art, here will not be described for the sake of brevity.

In the case where the first information and the second information comprise the size information, in the process of placing the target object into the scene and performing the design by the user, the size of the target object and the size information of the scene are matched, and the position information of the target object in the scene is generated in real time, thereby observing on the visual presentation whether the target object is suitable for placing in the scene based on the size information and position information, and further, if the target object is suitable for being placed in the scene, the visual effect can be determined based on the size information, and then the layout of the target object will be optimized. For example, for a relatively small room, although a six-foot bed can be put down, the designer will not consider purchasing a bed of this size because the placement of a six-foot bed in the relatively small room is neither aesthetical nor practical.

In the case where the first information and the second information optionally comprise, for example, color information and material information other than size information, after performing the visual presentation, the user who performs the space design can observe the more realistically design effects in real-time based on the layout of the target object on the visual presentation, in other words, can also implement the presentation in a three-dimensional stereoscopic effect, or by means of VR technology or AR technology, and in the three-dimensional mode, the user may view the design effects from different angles. Except for the size matching effect, these design effects can also comprise color matching effect and material matching effect, etc., and the presentation of design effects may be further optimized. For example, a dark-colored wall background is not suitable for decorating a light-colored photo frame, which cannot be determined only based on the size information without the color information or the material information; but once the first information and the second information containing for example, the color information and the material information other than the size information, the designer can make the determination easily.

As the second information optionally further comprises brand, price, inventory, hyperlink information associated with the target object (e.g., a sofa, a photo frame), after the user who performs the space design observes the design effects in real-time based on the layout of the target object on the visual presentation, the user can place an order directly on the third party shopping platform such as Jingdong, Taobao, Amazon and the like according to brand, price, inventory, hyperlink information associated with the target object included in the second information, thereby improving design and corresponding construction efficiency and reducing costs.

Preferably, the first information and/or the second information can further comprise information such as a personal preference or a behavioral habit record, and as the target object is acquired from the third party, the target object can be selected preferentially according to the information of the scene with personal preferences or behavioral habits, i.e., the third party platform may preferentially push the target object which is more matchable with preferences and behavior habits according to the information of the scene, thereby saving the time for the user to select and bringing better design experience.

Generally speaking, the application on the user terminal device can be connected with the smart tool, the user may test the construction site by the smart tool and test all useful data (for example, comparing the size on the drawings, the distance data, etc. with the actual measurement to determine whether these match each other or not), and then to generate 2D or 3D drawings. The design data template acquired by the e-commerce platform is imported into the application, and the user can re-design and edit the drawings, simulate and view the design effects.

Finally, in method step 140, the construction information will be calculated based on the layout of the target object by the user who performs the space design on the visual presentation. In this way, on one hand, it is possible to simultaneously acquire information about a scene and a target object to be placed in the scene from a device such as a portable device and generate related position information, after performing the visual presentation of the information, the user who performs the space design can observe the design effects in real-time base on the layout of the target object on the visual presentation, thereby determining whether to purchase, the construction can further be instructed according to the calculated construction information after designing, thus the design on the virtual visual presentation may be put into practice to recover to the actual scene. Generally speaking, after the user bought the commodities, the user can cooperate with the application on the smart terminal and the smart tool (such as the ranging and positioning instrument) to map, position, and then construct according to the design drawings in the on-site environment. Since the design files disclosed in the present disclosure can employ both conventional CAD format drawing files and new format files different from conventional CAD design drawings, these design files may be shared quickly by the current mainstream transmission ways (for example, network http/https download, mail, Apple airdrop, etc.) or social media sites. In addition, the measurement results of the smart mapping device (such as the ranging and positioning apparatus) are transmitted to the application software instantaneously, automatically and automatically, and the corresponding virtual objects in the drawings are automatically generated. The drawings in the application software can be edited and designed in real-time, and the acquired results can be shared by the current mainstream transmission ways (such as network http/https download, mail, apple airdrop, etc.). In addition, the drawings acquired by any way can be opened in the application software and quickly positioned by Bluetooth-driven smart mapping equipment, which saves time and effort, quickly transforms the virtual design into real construction information to guide the layout of decorative objects such as purchased furniture.

After calculating the construction information, how to further guide the user who performs the space design to recover the virtual space design to a real scene, the method can also comprise outputting the calculated construction information through the communication interface. Those skilled in the art should understand that the communication interface of the present invention comprises a wired interface, a Wi-Fi interface, a Bluetooth interface, a network interface, and other types of wireless communication technology interfaces, such as a ZigBee interface, an infrared interface, an NBIOT interface, a short message, and the like. In one embodiment in accordance with the present disclosure, outputting the calculated construction information through the communication interface comprises outputting the calculated construction information, through the communication interface, to a ranging and positioning apparatus to enable the ranging and positioning apparatus position the target object according to the construction information. The implementation in accordance with the present disclosure can allow the ranging and positioning apparatus to acquire the calculated construction information by means of communication, thereby causing the ranging and positioning apparatus to perform positioning of the target object based on the construction information.

Optionally or alternatively, in one embodiment in accordance with the present disclosure, the construction information comprises construction marking points displayed on the visual representation to enable layout of the target object by augmented reality technology. In such an implementation, another way can be provided to implement the layout, that is, to achieve the layout of the target object by augmented reality technology techniques in the way of construction marking points displayed on the visual presentation.

In addition, the first information of the scene to be spatially designed in the method step 110 can also be implemented in various manners. The first way is to acquire the first information to be spatially designed by the ranging and positioning apparatus, for example, by means of photographing and tool measuring, or by means of photographing and inputting the size information, or by photographing and a reference object with the size information; in addition, the second manner can receive the first information of the scene to be spatially designed in a communication manner, such as an apartment layout or ready-made design drawings, scene graph, and the like.

Figure 2:
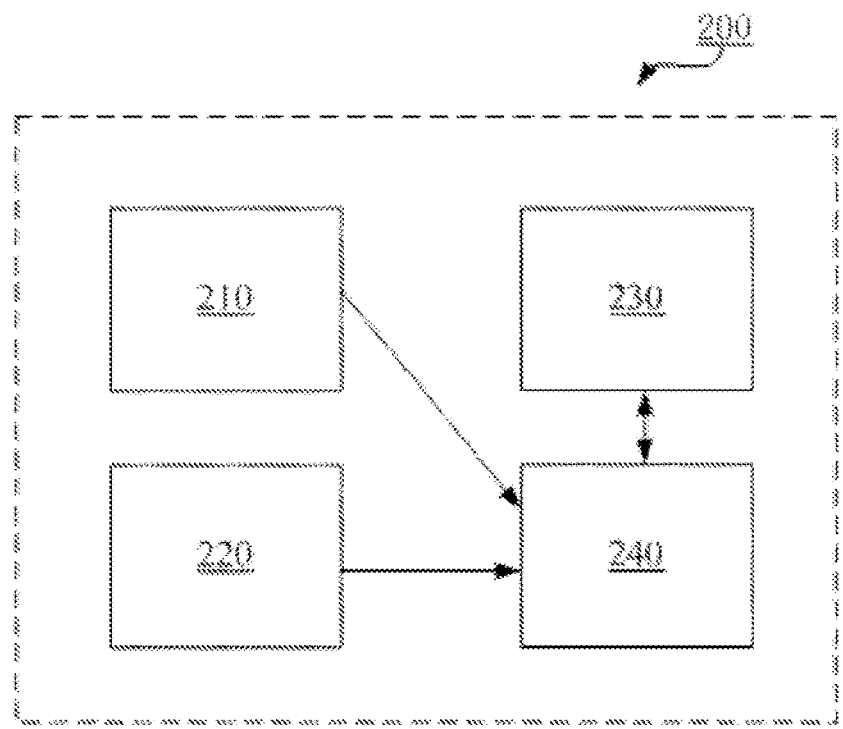
FIG. 2 illustrates a schematic diagram of a system for space design in accordance with the present disclosure according to certain embodiments of the present disclosure.

Further, the present disclosure also provides a system for space design implementing the above described method for space design, and FIG. 2 illustrates a schematic diagram of a system 200 for space design provided in accordance with the present disclosure. As can be seen from the figure, the system 200 for space design comprises the following modules: a first information acquisition module 210 configured to acquire first information of a scene to be spatially designed; a second information acquisition module 220 configured to acquire second information of a target object that can be placed into the scene from a third party through a communication interface; a visual presentation module 230 configured to visually present the first information and the second information; and a computing module 240 configured to calculate construction information based on the layout of the target object on the visual presentation performed by a user who performs the space design.

Here, the calculation module 240 can be, for example, a processor capable of performing the visual presentation of the first information of the scene to be spatially designed which is acquired by the first information acquisition module 210 and the second information of the target object of the scene which is acquired by the second information acquisition module 220 from the third party through the communication interface, to visually present the first information and the second information in the visual presentation module 230, and the visual presentation module 230 may be for example, a touch screen with a touch function.

In FIG. 2, the first information acquisition module 210 and the second information acquisition module 220 can be information receiving modules, can also be image acquisition modules such as an image acquisition module of a camera, which can acquire the first information associated with the scene to be spatially designed and the second information associated with a target object that can be placed into the scene. After acquiring the first information associated with the scene to be spatially designed and the second information associated with the target object that can be placed into the scene, the one-way arrow in FIG. 2 indicates that these pieces of the information may be output to, for example, the calculation module 240 of the processor, the calculation module 240 may perform the visual presentation of the first information of the scene to be spatially designed which is acquired by the first information acquisition module 210 and the second information of the target object of the scene which is acquired by the second information acquisition module 220 from the third party through the communication interface, to visually present the first information and the second information in the visual presentation module 230 such as a touch screen with a touch function.

Next, the designer may arrange the target object on a visual presentation module 230 such as a touch screen, and the calculation module 240 calculates the construction information based on the layout of the target object on the visual presentation made by a user who performs the space design, that is, the calculation module 240 may receive the design data by the visual presentation module 230, i.e., the drawing design data after the layout layout, and then the calculation module 240 may calculate construction information based on the layout of the target object on the visual presentation made by a user who performs the space design. It can be seen that the information interaction between the computing module 240 and the visual presentation module 230 may be bidirectional, and represented by a double-headed arrow in FIG. 2.

In one embodiment in accordance with the present disclosure, the system 200 further comprises an information output module (not shown) configured to output the calculated construction information through the communication interface. In one embodiment in accordance with the present disclosure, the information output module is further configured to output the calculated construction information, through the communication interface, to a ranging and positioning apparatus that performs ranging and positioning, such that the ranging and positioning apparatus performs positioning of the target object according to the construction information. In one embodiment in accordance with the present disclosure, the construction information comprises construction marking points displayed on the visual representation to implement the layout of the target object by augmented reality technology.

In one embodiment in accordance with the present disclosure, the first information and/or the second information comprise size information. In one embodiment in accordance with the present disclosure, the first information and/or the second information further comprise color information and/or material information. In one embodiment in accordance with the present disclosure, the second information further comprises brand, price, inventory, hyperlink information associated with the target object.

In one embodiment according to the present disclosure, the first information acquisition module 210 is further configured to: measure and acquire the first information of the scene to be spatially designed by the ranging and positioning apparatus; or receive the first information of the scene to be spatially designed in a communication manner.

In summary, the method for space design and the system for space design according to the present disclosure are capable of simultaneously acquiring information about a scene and a target object to be placed in the scene from a device such as a portable device, after performing the visual presentation of the information, the user who performs the space design can observe the design effects in real-time base on the layout of the target object on the visual presentation, thereby determining whether to purchase, the construction can further be instructed according to the calculated construction information after designing, thus the design on the virtual visual presentation may be put into practice to recover to the actual scene.

The two specific implementations of the method for space design provided in accordance with the present disclosure are described below by two specific embodiments. In the first embodiment, a smart mobile communication device application software (for example, a dedicated application running on an Android or IOS operating system), a distance detecting and positioning apparatus (which may be a surveying tool such as a ranging instrument, a ranging wheel, or which may also be a smart terminal such as a mobile phone or a Pad, an AR glasses, etc.) a scene (such as a wall, etc.), and a plurality of target objects. In this embodiment, the virtual scene can be first created by the smart mobile communication device application software, that is, the virtual image of the target object can be placed in the virtual scene and designed, and then the specified target object can be positioned in the current scene by the distance detecting and positioning apparatus.

Next, the specific implementation steps are described:

Firstly, acquiring a virtual design can be acquired by the following methods: the first method is to build a virtual scene (for example, provide a background image of the scene and its size) using smart mobile communication device application software. In the virtual scene, the outline shape of the target object may be drawn, and the size information of the target object may be acquired before loading. After acquiring the size information, it is possible to perform a specific design, such as a placement position. The second method is to acquire design drawings by a third-party platform. The design drawings may be imported into the smart mobile communication device application software by current mainstream wireless transmission ways (such as network http/https transmission, mail, apple airdrop, etc.). The smart mobile communication device application software has applied a specific file format corresponding to the apparatus operating system during the installation process, and when the file which is of the format file may be found, the above-mentioned smart mobile communication device application software can be recommended to the user to open the file. The drawing file may be parsed by the smart mobile communication device application software, and the file content can be parsed into a picture on the drawing, a coordinate point of the graphic outline, a coordinate point of the position, etc., and can be saved in the local database and rendered into a virtual design display by the communication device.

Then, the smart mobile communication device application software connects to the distance detecting apparatus via Bluetooth, and transmits the position information in the design to the distance detecting and positioning apparatus via Bluetooth.

Finally, by means of the positioning function of the distance detecting and positioning apparatus, the actual position of the target object in the design in the current scene is found, and the target object is placed. Virtual design may be converted to reality.

The embodiment to be described next will introduce how to convert a displayed scene into a virtual scene presentation by a distance detecting and positioning apparatus. In this method, the distance detecting and positioning apparatus may be used to measure the size of the corresponding scene which may be synchronized to the smart mobile communication device application software via Bluetooth, and the data may be converted into real distance information and stored in the local database by the software. Next, the size information acquired before using the smart mobile communication device application software may be as the size of the scene to build the virtual scene. The display of the scene on the smart mobile communication device application software filled the screen in one direction may be a reference to determine the scaling ratio, to convert the real size information into the points on the screen based on the scaling ratio, and to draw the points. Then, the size and position information of the target object can be measured by the distance detecting and positioning apparatus, and synchronized to the smart mobile communication device application software via Bluetooth and saved in the local database, and then converted into the points on the screen according to the previously acquired size and distance information and according to the previously determined scaling ratio, and the virtual size and respective outline of the target object can be drawn and then the design is made. Finally, at the time of saving, the size of the scene, the binary data of the picture, the coordinate information of the outline of the graphic, and the coordinate information of the position may be converted into a dedicated file format according to a defined method and stored in the local database. The virtual design file can be shared with a third party platform or the like with reference to the description in the previous embodiment. The actual scene is converted into a virtual design.

Figure 3:
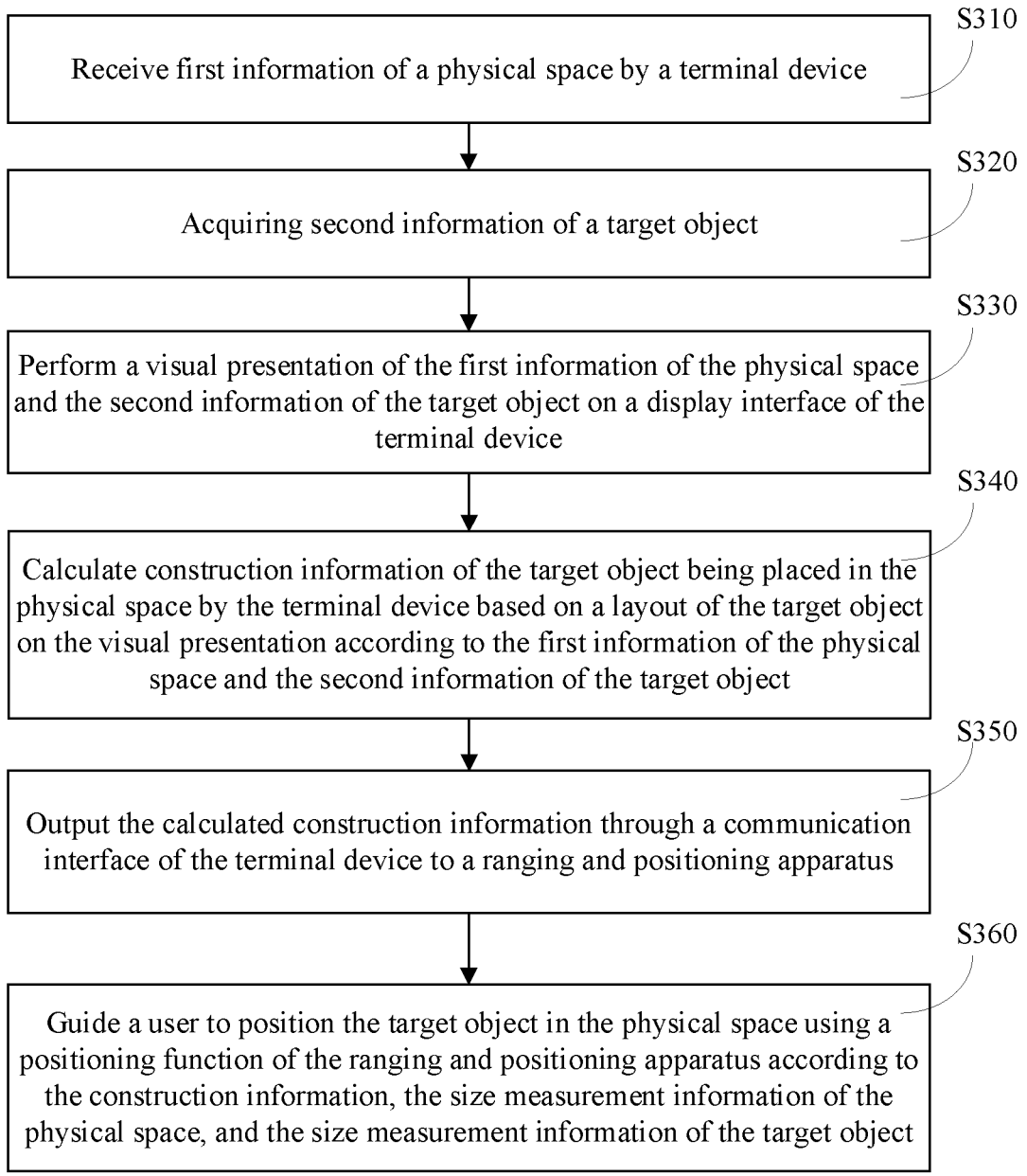
FIG. 3 illustrates the method for space design according to certain other embodiments of the present disclosure.

FIG. 3 shows the method for space design according to certain embodiments of the present disclosure. According to certain embodiments, the method may be applied to a terminal device. The terminal device may be a computing device, for example, a smartphone, a tablet, smart glasses, and so on. As shown in FIG. 3, the method 300 for space design may include the following steps.

Step S310 is to receive first information of a physical space by a terminal device. According to certain embodiments, the first information may include size measurement information of the physical space. Step S320 is to acquire second information of a target object. According to certain embodiments, the second information may include size measurement information of the target object. Step S330 is to perform a visual presentation of the first information of the physical space and the second information of the target object on a display interface of the terminal device.

Step S340 is to calculate construction information of the target object being placed in the physical space by the terminal device based on a layout of the target object on the visual presentation according to the first information of the physical space and the second information of the target object;

Step S350 is to output the calculated construction information through a communication interface of the terminal device to a ranging and positioning apparatus. In one example, the ranging and positioning apparatus may include a rangefinder, for example, a laser rangefinder. In another example, the ranging and positioning apparatus may include a ranging wheel.

Step S360 is to guide a user to position the target object in the physical space using a positioning function of the ranging and positioning apparatus according to the construction information, the size measurement information of the physical space, and the size measurement information of the target object. For example, the ranging and positioning apparatus may be equipped with a laser rangefinder. The ranging and positioning apparatus may use the positioning function of the laser rangefinder to locate a position in the physical space corresponding to a position in the construction information. Once the position in the physical space is identified by the ranging and positioning apparatus, the terminal device and/or the ranging and positioning apparatus may output a prompt signal to guide a user to position the target object in the physical space at the identified position. According to certain embodiments, the prompt signal may be an audio alert signal. In certain other embodiments, the prompt signal may be a visual prompt signal.

According to certain embodiments, the first information of the physical space may be acquired by a measurement performed by the ranging and positioning apparatus. Then, the first information may be received by the terminal device from the ranging and positioning apparatus through the communication interface of the terminal device.

According to certain embodiments, the second information of the target object may also be acquired by a measurement performed by the ranging and positioning apparatus. Then, the second information may be received by the terminal device from the ranging and positioning apparatus through the communication interface of the terminal device.
4. The method according to claim 1, wherein acquiring the second information of the target object includes:

Alternatively, the first and second information may be acquired through capturing a picture of the target object. For example, according to certain embodiments, the method may include capturing one or more two-dimensional (2D) photographs of the target object with a camera. Subsequently, the terminal device may acquire the second information of the target object according to the 2D photograph of the target object. In certain embodiments, the camera may be integrated with the terminal device. For example, the terminal device may be a smartphone or a tablet having one or more cameras. The terminal device may control the integrated camera to capture the 2D photograph. In certain other embodiments, an external camera may be used to take the 2D photograph. The terminal device may receive the 2D photographs from the external camera. According to certain embodiments, the terminal device may provide a user interface that prompt the user to take the 2D photographs. For example, the user interface may prompt the user to direct the camera toward the target object, and once target object is properly located within a view frame of the camera, the user may operate on a button in the user interface to capture the 2D paragraph.

In certain embodiments, a reference object with known size measurement may be placed in a vicinity of the target object. For example, the reference object may include a scale ruler showing length scales. When a 2D photograph includes both the reference object and the target object, a size measurement of the target object may be inferred by analyzing the 2D photograph. In certain embodiments, the one or more 2D photographs may include a plurality of 2D photographs taken from a plurality of angles in respect of the target object. For example, the camera may be used to take photographs of the target object from angles within a 360-degree angular range. The plurality of 2D photographs may include both the reference object and the target object. Size measurements of the target object in more than one dimensions may be inferred by the plurality of 2D photographs from different angles.

In certain embodiments, acquiring the second information of the target object according to the captured 2D photographs may include: processing the 2D photograph to extract a segmented image of the target object; and generating the size measurement information of the target object according to the segmented image of the target object. According to certain embodiments, the terminal device may perform the image segmentation and generate the size measurement information of the target object according to the segmented image of the target object. Alternatively, the terminal device may send the 2D photograph to a server. The server may process the 2D photograph to generate the segmented image. The terminal device may then receive the segmented image from the server. In certain embodiments, the terminal device may display the segmented image of the target object on the display interface of the terminal device. In certain embodiments, the terminal device may perform a search for a product picture that matches the 2D photograph in a database or on the Internet. Once a matching product picture is found, the terminal device may retrieve product information corresponding to the product picture in the database or on the Internet that matches the 2D photograph. Subsequently, the second information of the target object may be generated according to the product information corresponding to the product picture.

In certain other embodiments, instead of using a 2D photograph, a three-dimensional (3D) image may be used to obtain the first information of the physical space and/or the second information of the target object. For example, according certain embodiments, acquiring the second information of the target object may include: capturing a three-dimensional (3D) image of the target object with an augmented-reality (AR) function of an AR device; processing, by the AR device, the 3D image of the target object to generate the size measurement information of the target object; and receiving, by the terminal device, the size measurement information of the target object. Examples of the AR device may include AR glasses, smart glasses, heads up displays (HUD), and handheld AR devices. According to certain embodiments, the terminal device may include AR functionalities, and the AR module of the terminal device may be used. The 3D image may be used to infer size measurements of the target object in more than one dimensions.

Alternatively, the first information and/or the second information may be inputted by a user to the terminal device. For example, according to certain embodiments, acquiring the second information of the target object may include receiving a user input containing the second information of the target object. For example, the user may use the user interface of the terminal device to enter size measurement or other information of the target object.

Figure 4:
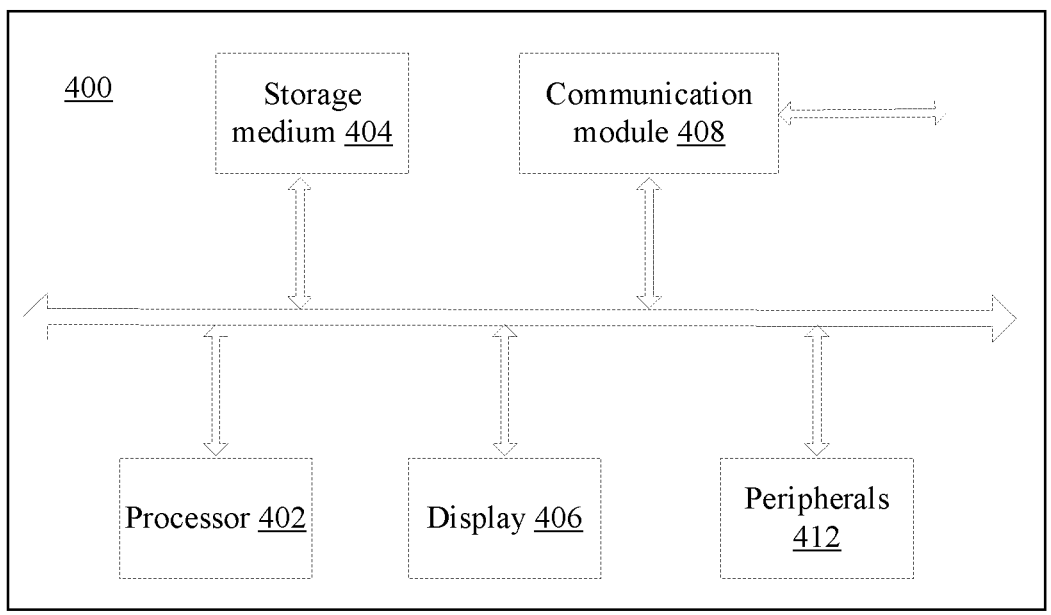
FIG. 4 illustrates a terminal device according to certain embodiments of the present disclosure.

FIG. 4 illustrates an example of hardware implementation of the terminal device 400 according to certain embodiments of the present disclosure. As shown in FIG. 4, the terminal device 400 may include computing device including a processor 402 and a storage medium 404. The terminal device 400 may further include a display or other output unit 406, a communication device 408, and additional peripheral devices 412. Certain devices may be omitted, and other devices may be included. Processor 102 may include any appropriate processor(s). In certain embodiments, processor 402 may include multiple cores for multi-thread or parallel processing. Processor 402 may execute sequences of computer program instructions to perform various processes, such as a neural network processing program. Storage medium 404 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 404 may store computer programs and instructions for implementing various processes, when executed by processor 402, cause the processor to perform various steps of the space design method. The communication module 408 may include network devices for establishing connections through a network. Display 406 may include any appropriate type of display device or electronic device display (e.g., CRT or LCD based devices, touch screens, VR headsets, etc.). Peripherals 412 may include additional I/O devices, such as a keyboard, a mouse, a camera, a microphone, and so on. The processor 402 may be configured to execute instructions stored on the storage medium 404 and perform various operations related to the space design method as detailed in the following descriptions.

It will be understood by those skilled in the art that many changes and modifications of the above disclosed embodiments can be made without departing from the scope of the invention. Therefore, the scope of the invention should be defined by the appended claims.

Although various exemplary embodiments of the present invention have been described, it is apparent to those skilled in the art that various changes and modifications can be made without departing from the spirit and scope of the invention to achieve one or some of the advantages of the present invention. It is apparent to those skilled in the art that other components performing the same function may be appropriately replaced. It will be appreciated that features explained herein with reference to particular figures may be combined with features of other figures, even in those cases where this is not explicitly mentioned. Moreover, the method of the present invention can be implemented in either a software implementation using appropriate processor instructions or in a hybrid implementation using a combination of hardware logic and software logic to achieve the same results. Such modifications to the aspects of the invention are intended to be covered by the appended claims.

What is claimed is:

1. A method for space design, the method comprising:
   receiving first information of a physical space by a terminal device, the first information including size measurement information of the physical space;
   acquiring second information of a target object, the second information including size measurement information of the target object;
   performing a visual presentation of the first information of the physical space and the second information of the target object on a display interface of the terminal device;
   calculating construction information of the target object being placed in the physical space by the terminal device based on a layout of the target object on the visual presentation according to the first information of the physical space and the second information of the target object;
   outputting the calculated construction information through a communication interface of the terminal device to a ranging and positioning apparatus; and
   guiding a user to position the target object in the physical space using a positioning function of the ranging and positioning apparatus according to the construction information, the size measurement information of the physical space, and the size measurement information of the target object.

2. The method according to claim 1, further comprising:
   acquiring the first information of the physical space by a first measurement performed by the ranging and positioning apparatus; and
   receiving, by the terminal device, the first information of the physical space from the ranging and positioning apparatus through the communication interface of the terminal device.

3. The method according to claim 1, wherein acquiring the second information of the target object includes:
   acquiring the second information of the target object by a second measurement performed by the ranging and positioning apparatus; and
   receiving, by the terminal device the second information from the ranging and positioning apparatus through the communication interface of the terminal device.

4. The method according to claim 1, wherein acquiring the second information of the target object includes:
   capturing one or more two-dimensional (2D) photographs of the target object with a camera; and
   acquiring, by the terminal device, second information of the target object according to the 2D photograph of the target object.

5. The method according to claim 4, wherein acquiring the second information of the target object includes:
   capturing, by the camera, a plurality of two-dimensional (2D) photographs of the target object from a plurality of angles; and
   acquiring, by the terminal device, second information of the target object according to the plurality of 2D photographs of the target object.

6. The method according to claim 4, wherein acquiring the second information of the target object according to the captured 2D photograph includes:
   processing the one or more 2D photographs to extract one or more segmented images of the target object; and
   generating the size measurement information of the target object according to the one ore more segmented images of the target object.

7. The method according to claim 4, wherein acquiring the second information of the target object according to the captured photograph includes:
   transmitting, by the terminal device, the one ore more 2D photographs to a server;

receiving, by the terminal device, one or more segmented images of the target object from the server after the 2D photographs have been processed by the server;

displaying, by the terminal device, the one or more segmented images of the target object on the display interface of the terminal device; and generating, by the terminal device, the size measurement information of the target object according to the one or more segmented images of the target object.

8. The method according to claim 4, wherein acquiring the second information of the target object according to the captured photograph includes:

searching, by the terminal device, for a product picture that matches the one or more 2D photographs in a database or on Internet;

retrieving, by the terminal device, product information corresponding to the product picture in the database or on Internet that matches the 2D photograph; and generating, by the terminal device, the second information of the target object according to the product information corresponding to the product picture.

9. The method according to claim 1, wherein acquiring the second information of the target object includes:

capturing a three-dimensional (3D) image of the target object with an augmented-reality (AR) function of an AR device;

processing, by the AR device, the 3D image of the target object to generate the size measurement information of the target object; and receiving, by the terminal device, the size measurement information of the target object.

10. The method according to claim 1, wherein acquiring the second information of the target object includes:

receiving, by the terminal device, a user input containing the second information of the target object.

11. The method of claim 1, wherein the construction information comprises construction marking points displayed on the visual presentation to implement the layout of the target object by augmented reality technology.

12. The method of claim 1, wherein the first information and/or the second information further include color information and/or material information.

13. The method of claim 1, wherein the second information further includes brand, price, inventory, and hyperlink information associated with the target object.

14. A terminal device, comprising:

a memory, storing computer-executable instructions; and a processor, coupled with the memory and, when the computer-executable instructions being executed, configured to perform:

receiving first information of a physical space, the first information including size measurement information of the physical space;

acquiring second information of a target object, the second information including size measurement information of the target object;

performing a visual presentation of the first information of the physical space and the second information of the target object on a display interface of the terminal device;

calculating construction information of the target object being placed in the physical space based on a layout of the target object on the visual presentation according to the first information of the physical space and the second information of the target object;

outputting the calculated construction information through a communication interface to a ranging and positioning apparatus; and guiding a user to position the target object in the physical space using a positioning function of the ranging and positioning apparatus according to the construction information, the size measurement information of the physical space, and the size measurement information of the target object.

15. The terminal device according to claim 14, wherein the processor is further configured to perform:

receiving the first information of the physical space from the ranging and positioning apparatus through the communication interface of the computing device, the first information being obtained by the ranging and positioning apparatus according to a first measurement; and receiving the second information of the target object from the ranging and positioning apparatus through the communication interface of the computing device, the second information being obtained by the ranging and positioning apparatus according to a second measurement.

16. The terminal device according to claim 14, wherein the processor is further configured to perform:

receiving one or more two-dimensional (2D) photographs of the target object from a camera; and acquiring second information of the target object according to the one or more 2D photographs of the target object.

17. The terminal device according to claim 14, wherein the processor is further configured to perform:

receiving a three-dimensional (3D) image of the target object from an augmented reality (AR) device; and acquiring second information of the target object according to the 3D image of the target object.

18. A non-transitory computer-readable storage medium storing a plurality of instructions, wherein the plurality of instructions, when executed by a processor, cause the processor to perform:

receiving first information of a physical space, the first information including size measurement information of the physical space;

acquiring second information of a target object, the second information including size measurement information of the target object;

performing a visual presentation of the first information of the physical space and the second information of the target object on a display interface of the terminal device;

calculating construction information of the target object being placed in the physical space based on a layout of the target object on the visual presentation according to the first information of the physical space and the second information of the target object;

outputting the calculated construction information through a communication interface to a ranging and positioning apparatus; and guiding a user to position the target object in the physical space using a positioning function of the ranging and positioning apparatus according to the construction information, the size measurement information of the physical space, and the size measurement information of the target object.

19. The non-transitory computer-readable storage medium according to claim 18, wherein the plurality of instructions, when executed by a processor, cause the processor to further perform:

receiving the first information of the physical space from the ranging and positioning apparatus through the communication interface of the computing device, the first information being obtained by the ranging and positioning apparatus according to a first measurement; and receiving the second information of the target object from the ranging and positioning apparatus through the communication interface of the computing device, the second information being obtained by the ranging and positioning apparatus according to a second measurement.

20. The non-transitory computer-readable storage medium according to claim 18, wherein the plurality of instructions, when executed by a processor, cause the processor to further perform:

receiving one or more two-dimensional (2D) photographs of the target object from a camera; and acquiring second information of the target object according to the one or more 2D photographs of the target object.

* * * * *